United States Patent
Wu

(10) Patent No.: US 12,184,928 B2
(45) Date of Patent: Dec. 31, 2024

(54) LATENCY-REDUCED SERVICE-LEVEL CONTENT DELIVERY NETWORK

(71) Applicant: Charter Communications Operating, LLC, St. Louis, MO (US)

(72) Inventor: Deh-Min Richard Wu, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/533,665

(22) Filed: Dec. 8, 2023

(65) Prior Publication Data

US 2024/0397140 A1 Nov. 28, 2024

Related U.S. Application Data

(63) Continuation of application No. 18/323,638, filed on May 25, 2023, now Pat. No. 11,877,025.

(51) Int. Cl.
*H04N 21/437* (2011.01)
*H04N 21/2183* (2011.01)
*H04N 21/239* (2011.01)

(52) U.S. Cl.
CPC ....... *H04N 21/437* (2013.01); *H04N 21/2183* (2013.01); *H04N 21/239* (2013.01)

(58) Field of Classification Search
CPC . H04N 21/437; H04N 21/2183; H04N 21/239
See application file for complete search history.

(56) References Cited

U.S. PATENT DOCUMENTS

| 2010/0082737 A1 | 4/2010 | Dankle et al. |
| 2010/0185753 A1* | 7/2010 | Liu ................. H04L 67/104 709/219 |
| 2014/0164563 A1* | 6/2014 | Leekley ............ H04L 67/1063 709/217 |

OTHER PUBLICATIONS

Trossen, D., et al. "Routing on Service Addresses." Internet Engineering Task Force Draft, Document ID draft-trossen-rtgwg-rosa-00 (Oct. 4, 2022): 1-29.
"Network service access point address", www.wikipedia.org, 2023 [retrieved on Aug. 18, 2023] Retrieved from the Internet: <URL: https://en.wikipedia.org/w/index.php?title=Network_service_access_point_address&oldid=1155091157I> (2 pages).

(Continued)

*Primary Examiner* — Bryan Y Lee
(74) *Attorney, Agent, or Firm* — Mendelsohn Dunleavy, P.C.; Steve Mendelsohn

(57) ABSTRACT

A content delivery network (CDN) includes UE gateways, a service switch (SS) mesh network, and server gateways. The CDN nodes maintain cache lists of mappings identifying corresponding upstream system nodes for content items available at content servers connected to the server gateways. When a CDN node receives an upstream service instance request for a specific content item by a corresponding UE connected to a UE gateway, upon determining that a mapping for the specific content item is in its cache list, the CDN node forwards the upstream service instance request to the corresponding upstream system node as part of a process of defining a downstream data path for the specific content item from the corresponding content server to the corresponding UE. The CDN enables service-level content delivery at lower levels of latency than conventional DNS-based systems.

33 Claims, 7 Drawing Sheets

(56) References Cited

OTHER PUBLICATIONS

"What is a DNS root server?", www.cloudflare.com, 2018 [retrieved on Aug. 18, 2023] Retrieved from the Internet: <URL: https://www.cloudflare.com/learning/dns/glossary/dns-root-server/> (4 pages).
"Denial of Service (DOS) guidance." www.ncsc.gov.uk, 2016 [retrieved on Aug. 18, 2023] Retrieved from the Internet: <URL: https://www.ncsc.gov.uk/collection/denial-service-dos-guidance-collection> (6 pages).

* cited by examiner

LATENCY-REDUCED SERVICE-LEVEL CONTENT DELIVERY NETWORK

CROSS-REFERENCE TO RELATED APPLICATIONS

This is a continuation of co-pending application Ser. No. 18/323,638, filed on May 25, 2023, the teachings of which are incorporated herein by reference in their entirety.

BACKGROUND

Field of the Disclosure

The present disclosure relates to content delivery networks that can deliver content items, such as movies and other video programs, from content servers to user equipment, such as laptops and cell phones.

Description of the Related Art

This section introduces aspects that may help facilitate a better understanding of the disclosure. Accordingly, the statements of this section are to be read in this light and are not to be understood as admissions about what is prior art or what is not prior art.

In a conventional content delivery network (CDN), a user, who wants to retrieve a content item from a web-based content server having a known domain name (i.e., uniform resource locator (URL)), uses user equipment (UE), such as a laptop or a cell phone, to transmit a request to a Domain Name System (DNS) server that maps domain names to Internet Protocol (IP) addresses in order to retrieve the IP address of the content server. The conventional mechanism is a DNS-based process occurring every time a new web-based content item is accessed by a UE. After this mechanism, the UE then transmits, via one or more user plane functions (UPFs) of the CDN network, a packetized request containing (i) the UE's IP address as the source node address and (ii) the retrieved IP address of the content server as the destination node address in the packet header to request the content item from the content server, which, if appropriate, responds to the packetized request by transmitting, back to the UE, packets containing payloads corresponding to portions of the requested content item. Such DNS-based processing adds latency to the delivery of the desired content item, especially when DNS servers are handling many concurrent requests from UEs.

SUMMARY

In certain embodiments, the present disclosure is directed to a content delivery network (CDN) (e.g., 120) for delivering content items in a content delivery system (e.g., 100). The CDN comprises one or more user equipment (UE) gateways (e.g., 130), each UE gateway configured to be connected to one or more UEs (e.g., 110); a service switch (SS) mesh network (e.g., 140) comprising two or more levels (e.g., 142(1)-142(2)), each level comprising one or more service switches (e.g., 144), wherein each UE gateway is connected to a service switch in a first level of the SS mesh network; and one or more server gateways (e.g., 150), each server gateway configured to be connected to one or more content servers (e.g., 160), wherein each server gateway is connected to a service switch in a last level of the SS mesh network (e.g., 142(2)). Each UE gateway, service switch, and server gateway is a CDN node of the CDN network, and each UE, CDN node, and content server is a system node of the content delivery system. A CDN node is configured to maintain a cache list of mappings, each mapping identifying a corresponding upstream system node for a content item available at a corresponding content server of the content delivery system. The CDN node is configured to receive an upstream service instance request for a specific content item by a corresponding UE and, upon determining that a mapping for the specific content item is in its cache list, forward the upstream service instance request to the corresponding upstream system node as part of a process of defining a downstream data path for the specific content item from the corresponding content server to the corresponding UE.

In at least some of the above embodiments, a UE gateway is configured to receive an upstream service instance request for a specific content item by a corresponding UE and, upon determining that a mapping for the specific content item is not in its cache list, forward an upstream path registration request to a connected service switch to initiate a path registration process for defining a downstream data path for the specific content item from the corresponding content server to the corresponding UE.

In at least some of the above embodiments, the UE gateway is configured to include a defined path in the upstream path registration request that includes an IP address of the corresponding UE, its own IP address, and an IP address of the connected service switch.

In at least some of the above embodiments, a service switch is configured to receive an upstream service instance request for a specific content item by a corresponding UE and, upon determining that a mapping for the specific content item is not in its cache list, forward an upstream path registration request to a connected upstream CDN node to initiate a path registration process for defining a downstream data path for the specific content item from the corresponding content server to the corresponding UE.

In at least some of the above embodiments, the service switch is configured to append an IP address of the upstream CDN node to a defined path in the upstream path registration request.

In at least some of the above embodiments, a service switch is configured to receive an upstream path registration request for a specific content item and, upon determining that a mapping for the specific content item is not in its cache list, forward the upstream path registration request to a connected upstream CDN node to continue a path registration process for defining a downstream data path for the specific content item from the corresponding content server to the corresponding UE.

In at least some of the above embodiments, the service switch is configured to append an IP address of the upstream CDN node to a defined path in the upstream path registration request.

In at least some of the above embodiments, a service switch is configured to receive an upstream path registration request for a specific content item and, upon determining that a mapping for the specific content item is in its cache list, send an upstream service instance request for the specific content item to a connected upstream CDN node to continue a path registration process for defining a downstream data path for the specific content item from the corresponding content server to the corresponding UE.

In at least some of the above embodiments, the service switch is configured to append an IP address of the upstream CDN node to a defined path in the upstream service instance request.

In at least some of the above embodiments, a server gateway is configured to receive an upstream path registration request for a specific content item and, upon determining that a mapping for the specific content item is not in its cache list, send a negative downstream path registration reply for the specific content item to a connected downstream service switch.

In at least some of the above embodiments, the server gateway removes its IP address from a defined path in the negative downstream path registration reply.

In at least some of the above embodiments, a server gateway is configured to receive an upstream path registration request for a specific content item and, upon determining that a mapping is in its cache list for the specific content item identifying a specific content server, send an upstream service instance request for the specific content item to the specific content server.

In at least some of the above embodiments, the server gateway is configured to append an IP address of the content server to a defined path in the upstream service instance request.

In at least some of the above embodiments, upon receiving a positive downstream service instance reply, a server gateway is configured to forward the positive downstream service instance reply to a service switch identified in the positive downstream service instance reply.

In at least some of the above embodiments, upon receiving a positive downstream service instance reply, a service switch is configured to forward the positive downstream service instance reply to a downstream CDN node identified in the positive downstream service instance reply.

In at least some of the above embodiments, upon receiving a positive downstream service instance reply, a UE gateway is configured to forward the positive downstream service instance reply to a downstream UE identified in the positive downstream service instance reply.

In at least some of the above embodiments, upon receiving a negative downstream path registration reply for a specific content item and upon determining that another possible path exists for the specific content item, a service switch sends an upstream path registration request to an upstream CDN node corresponding to the other possible path.

In at least some of the above embodiments, the service switch is configured to append an IP address of the upstream CDN node to a defined path in the upstream service instance request.

In at least some of the above embodiments, upon receiving a negative downstream path registration reply for a specific content item and upon determining that another possible path does not exist for the specific content item, a service switch forwards the negative downstream path registration reply to a downstream CDN node identified in the negative downstream path registration reply.

In at least some of the above embodiments, the service switch removes its IP address from a defined path in the negative downstream path registration reply.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
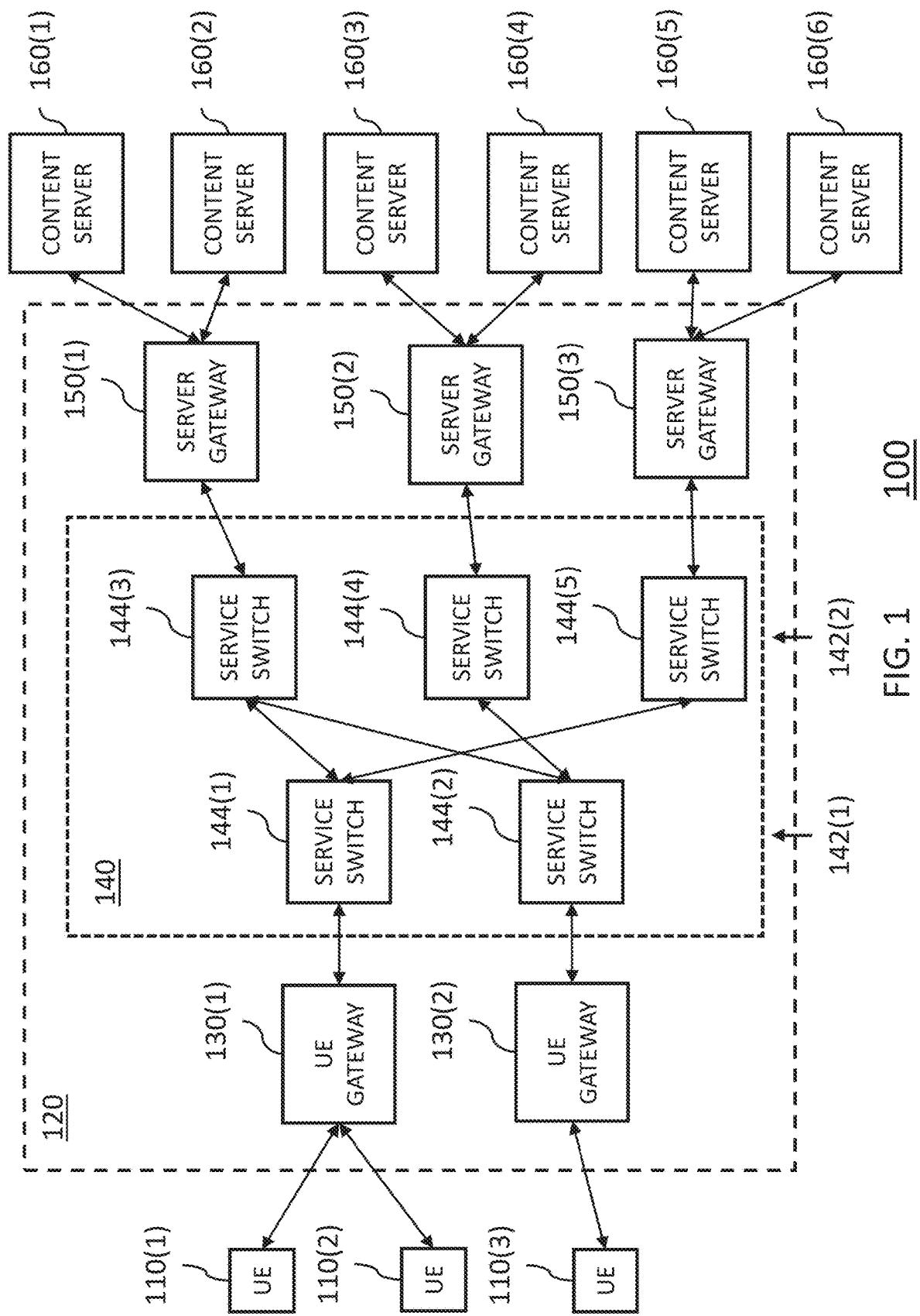
FIG. 1 is a simplified hardware block diagram of an example latency-reduced service-level content delivery system according to certain embodiments of the present disclosure.

FIG. 1 is a simplified hardware block diagram of an example latency-reduced service-level content delivery system 100 according to certain embodiments of the present disclosure. The system 100 of FIG. 1 includes UEs 110 interconnected with content servers 160 by a content delivery network (CDN) 120 comprising UE gateways 130 and server gateways 150 interconnected by an SS (service switch) mesh network 140 having levels 142 of service switches 144, where each UE gateway 130 is connected to a service switch 144 and one or more UEs 110, and each server gateway 150 is connected to a service switch 144 and one or more content servers 160. The UE gateways 130, service switches 144, and server gateways 150 may be referred to generically as "CDN nodes" of the CDN network 120, while those CDN nodes, the UEs 110, and the content servers 160 may be referred to as "system nodes" of the content delivery system 100.

In the implementation of the present disclosure represented by the example content delivery system 100 of FIG. 1, the following constraints apply:
- Each UE 110 can be connected to a single UE gateway 130 at a time, although the connection for a (e.g., mobile) UE 110 can change over time;
- Each UE gateway 130 is connected to a single service switch 144 in the first level 142(1) of the SS mesh network 140, and vice versa;
- Each server gateway 150 is connected to a single service switch 144 in the last level 142(2) of the SS mesh network 140, and vice versa; and
- Each content server 160 is connected to a single server gateway 150.

In other implementations, one or more of these constraints may be relaxed, and those skilled in the art will understand how to extend the features of the present disclosure to those implementations.

As used herein, the direction from a UE 110 towards a content server 160 through the CDN network 120 is referred to herein as the "upstream" direction, and the opposite direction is referred to as the "downstream" direction. For example, referring to FIG. 1, service switch 144(1) is upstream of UE gateway 130(1), and service switch 144(1) is downstream of service switches 144(3) and 144(5). A message received by service switch 144(1) from UE gateway 130(1) is an upstream message, and a message received by service switch 144(1) from service switch 144(3) is a downstream message.

Each content server 160 contains one or more content items, such as movies and other video programs, that are available to subscribers and other authorized users of UEs 110. Each server gateway 150 is a Layer 3 device that provides access to the content items available from one or more connected content servers 160. The service switches 144 of the SS mesh network 140 are Layer 3 switches that are able to forward packets based on their destination IP addresses. Each UE gateway 130 is a Layer 3 device that provides one or more UEs 110 access via the CDN network 120 to the content items available at the content servers 160. A UE gateway 130 can be implemented, for example, at (i) a home residential gateway if a SmartRG router is installed at home, (ii) an aggregated access switch over ONT (Optical Network Termination) with extended DHCP (Dynamic Host Configuration Protocol) function, (iii) an SMF (Session Management Function) with extended DNS, DHCP function, or (iv) a UPF with extended DNS, DHCP function. Each UE 110 runs a web-based application that enables the UE 110 to access content items from one or more content servers 160.

As used herein, the term "content item" refers to a particular movie or other item of content that is available from a content server 160, while the term "service instance" refers to an instance of a particular content server 160 streaming a particular content item to a particular UE 110 through the CDN network 120.

In some implementations, each UE gateway 130 and its connected service switch 144 in the first level 142(1) of the SS mesh network 140 can be implemented at the same physical location and possibly by the same central processing unit (CPU). Similarly, each server gateway 150 and its connected service switch 144 in the last level 142(2) of the SS mesh network 140 can be implemented at the same physical location and possibly by the same CPU.

In some other implementations, each UE gateway 130 and its connected service switch 144 in the first level 142(1) of the SS mesh network 140 can be implemented by different CPUs at different physical locations. Similarly, each server gateway 150 and its connected service switch 144 in the last level 142(2) of the SS mesh network 140 can be implemented by different CPUs at different physical locations. Both implementation alternatives at the same physical location and at different physical locations can co-exist in the same system.

The particular content delivery system 100 shown in FIG. 1 includes three UEs 110(1)-110(3), two UE gateways 130(1)-130(2), five service switches 144(1)-144(5), three server gateways 150(1)-150(3), and six content servers 160(1)-160(6) connected as shown in FIG. 1, where the SS mesh network 140 has two levels 142(1)-142(2), where the first level 142(1) includes service switches 144(1)-144(2), and the last level 142(2) includes service switches 144(3)-144(5). Those skilled in the art will understand that other embodiments of the present disclosure can have the same or different numbers of each of these system nodes with the same or different interconnections, including the same or different numbers of levels in the SS mesh network with the same or different numbers of service switches in each level.

Depending on the particular implementation, each interconnection between two system nodes can individually be wireless, wired, or optical. For example, in one possible implementation, the interconnections between the UEs 110 and the UE gateways 130 may individually be either wireless or wired, while (i) the interconnections between the CDN nodes and (ii) the interconnections between the server gateways 150 and the content servers 160 are all wired.

In operation, when a user wants to receive a specific content item, the user uses the web-based application on their UE 110 to transmit a (packetized) service instance request to its connected UE gateway 130 for that specific content item to begin a process of defining a data path through the CDN network 120 from a content server 160 having that specific content item to the UE 110. The service instance request contains a service address (e.g., a web link http://domain-name/service-name or a search string "movie Jurassic park") for the specific content item.

Each CDN node 130/144/150 maintains a cache list of mappings, each mapping identifying the IP address of a corresponding upstream system node 144/150/160 for a content item available at a corresponding content server 160. When a CDN node 130/144/150 receives an upstream service instance request for a specific content item from a downstream system node 110/130/144, the CDN node 130/144/150 determines whether its cache list has a mapping for the specific content item. If so, then the CDN node 130/144/150 forwards the service instance request to the corresponding upstream system node 144/150/160 identified by that mapping with the IP address of corresponding upstream system node 144/150/160 appended to a defined path contained in the service instance request.

When a UE gateway 130 receives an upstream service instance request for a specific content item from a UE 110, the UE gateway 130 determines whether its cache list contains a mapping for the specific content item to a service switch 144 in the first level 142(1) of the SS mesh network 140. If so, then the UE gateway 130 forwards the upstream service instance request to that service switch 144 with the defined path being the IP address of the UE 110 that sent the service instance request, its own IP address, and the IP address of that service switch 144 appended together.

Note that, as described further below, if a UE gateway 130 contains a mapping for a specific content item, then mappings will already exist in at least one service switch 144 in each level of the SS mesh network 140 and in at least one server gateway 150 for that specific content item. As such, each service switch 144 and each server gateway 150 that receives an upstream service instance request from a downstream CDN node 130/144 will identify a mapping in its cache list for the specific content item, append the upstream system node 144/150/160 identified by that mapping to the defined path, and forward the upstream service instance request to that upstream system node 144/150/160.

When a content server 160 receives an upstream service instance request from a server gateway 150, the content server 160 will determine whether to create a service instance for the specific content item. This determination may be based on a number of different criteria, such as, for example, whether the user of the UE 110 is authorized to receive the specific content item and whether the server gateway 150 has the bandwidth to support the service instance at the requested quality of service (QOS). If the content server 160 determines that the service instance can be created, then the content server 160 transmits a positive downstream service instance reply back to the same server gateway 150 with the full defined path from the content server 160 to the UE 110 that sent the original service instance request, with each CDN node 130/144 along the defined path forwarding the positive downstream service instance reply to the next downstream system node 110/130/144 along the defined path until the positive downstream service instance reply is received by that UE 110. When the UE 110 receives the reply from content server 160 indicating that the signaling of the defined data path has been completed successfully, then, for the next steps, for example, the user plane data path can be used for user authorization, billing instructions, designated service functions, and subsequent video data streaming.

Note that, it is possible for a CDN node 130/144/150 to have two or more mappings in its cache list for the same content item, e.g., when that content item is available from two or more different content servers 160. In that case, the CDN node 130/144/150 will apply some decision-making process, such as, for example, load balancing, round robin, or random, to determine which mapping to use.

If the content server 160 determines that the service instance cannot be created, then the content server 160 transmits a negative downstream service instance reply back to the same server gateway 150. The server gateway 150 forwards the negative downstream service instance reply to the next downstream server switch 144 identified in the defined path.

If and when a service switch 144 receives a negative downstream service instance reply, then the service switch 144 determines whether its cache list has another mapping for the specified content item. For example, if a specific content item is available from both content server 160(2) and content server 160(6) and if service switch 144(1) receives a negative downstream service instance reply for that specific content item from service switch 144(3) (e.g., because the user of the UE 110 is not a subscriber to the services of content server 160(2)), then service switch 144(1) will determine whether its cache list has another mapping for that specific content item. In this example, service switch 144(1) may have another mapping for that specific content item identifying service switch 144(5) as part of a path to content server 160(6). In that case, service switch 144(1) will transmit a second upstream service instance request to service switch 144(5) with the IP address of service switch 144(5) appended to the defined path. In this example, service switch 144(5) will have a mapping for the specific content item to server gateway 150(3), and server gateway 150(3) will have a mapping for the specific content item to content server 160(6), such that the content server 160(6) will eventually receive the second upstream service instance request and determine whether to create a service instance for the specific content item. Note that, in this example, service switch 144(1) keeps track of which of its mappings have already been used to avoid repeatedly using the same mappings over and over again for the same service instance request.

If a service switch 144 determines that it has no more mappings for the specific content item to use, then the service switch 144 forwards the negative downstream service instance reply to the next downstream CDN node 130/144. When a UE gateway 130 receives a negative downstream service instance reply from an upstream service switch 144, the UE gateway 130 forwards the negative downstream service instance reply to the UE 110 identified in the defined path.

When a UE gateway 130 receives an upstream service instance request for a specific content item from a UE 110 and the UE gateway 130 determines that its cache list does not contain a mapping for the specific content item, then the UE gateway 130 initiates a path registration process by transmitting an upstream path registration request for the specific content item to a service switch 144 in the first level 142(1) of the SS mesh network 140 with a defined path being the IP address of the UE 110 that sent the service instance request, its own IP address, and the IP address of that service switch 144 appended together.

When a service switch 144 receives an upstream path registration request for a specific content item from a downstream CDN node 130/144, the service switch 144 determines whether its cache list has a mapping for the specific content item. If not, then the service switch 144 forwards the upstream path registration request to one of its connected upstream CDN nodes 144/150 with the IP address of that upstream CDN node 144/150 appended to the defined path. If, however, the service switch 144 determines that its cache list does have a mapping for the specific content item, then the service switch 144 transmits a positive downstream path registration reply to the next upstream CDN node 130/144 identified in the defined path.

When a server gateway 150 receives an upstream path registration request for a specific content item from a service switch 144, the server gateway 150 determines whether its cache list has a mapping for the specific content item to a specific content server 160. If so, then the server gateway 150 sends a positive downstream path registration reply for the specific content item to the service switch 144. Otherwise, the server gateway 150 sends a negative downstream path registration reply for the specific content item to the service switch 144.

When a service switch 144 receives a positive downstream path registration reply for a specific content item from an upstream CDN node 144/150, the service switch 144 adds a mapping to its cache list for that specific content item to that upstream CDN node 144/150 and forwards the positive downstream path registration reply to the next downstream CDN node 130/144.

When a service switch 144 receives a negative downstream path registration reply for a specific content item from an upstream CDN node 144/150, the service switch 144 determines whether there is another connected upstream CDN node 144/150 that it has not tried yet (e.g., using random or round robin selection). For example, if service switch 144(1) receives a negative downstream path registration reply for a specific content item from upstream service switch 144(3), service switch 144(1) might determine that upstream service switch 144(5) has not been tried yet. In that case, service switch 144(1) transmits a second upstream path registration request to service switch 144(5) with the IP address of service switch 144(5) appended to the defined path instead of the IP address of service switch 144(3) and the IP address of the server gateway 150(1). If there are no other upstream CDN nodes 144/150 to try, then the service switch 144 forwards the negative downstream path registration reply for the specific content item to the next downstream CDN node 130/144.

When a UE gateway 130 receives a negative downstream path registration reply for a specific content item from a service switch 144, it means that no path through the CDN network 120 is possible for that specific content item. In that case, the UE gateway 130 sends a negative service instance reply to the UE 110 that sent the original service instance request.

When a UE gateway 130 receives a positive downstream path registration reply for a specific content item from a service switch 144, the UE gateway 130 adds a mapping to its cache list for that specific content item to that service switch 144 and sends an upstream service instance request for the specific content item back to the service switch 144 with the defined path containing the IP address of the UE 110 that sent the original service instance request, its own IP address, and the IP address of the service switch 144 to continue the process of attempting to create a service instance for the specific content item.

If and when a path is successfully defined for a specific content item from a specific content server 160 to a specific UE 110, that content server 160 can then use that defined path to stream packetized downstream messages containing portions of that content item to that UE 110. Whenever a service instance has been created, the user registration and authorization procedures between client (i.e., the user of the UE 110) and service (i.e., the operator of the content server 160) can be executed. Furthermore, each CDN node 130/144/150 along that defined path will have a mapping in its cache list for the specific content item identifying the next upstream system node 144/150/160 along that defined path to use in processing future service instance requests for the same content item from the same or other UEs 110.

In some implementations, the CDN network 120 supports segment routing (SR) in which the headers of the packetized downstream messages transmitted from the content server 160 to the UE 110 explicitly identify the downstream nodes along the defined path. In other conventional implementations, the defined path is programmed (aka nailed up) in the corresponding CDN nodes 130/144/150.

If multiple UEs 110 concurrently request the same service instance from the same content server 160, the content server 160 creates a separate service instance for each different service request that is accepted.

As described above, a UE gateway 130 or a service switch 144 can acquire a mapping for a specific content item as part of the process of handling a service instance request for that content item from a UE 110. The other way in which the UE gateways 130 and service switches 144 can acquire such mappings is via service publication. Each content server 160 is responsible to providing information (i.e., service availability data) about each of its available content items to its connected server gateway 150. In response, each server gateway 150 stores a corresponding mapping in its cache list for each of those content items. In addition, each server gateway 150 can selectively publish that same information for one or more of those content items to one or more service switches 144 and one or more UE gateways 130. During the service publication process, each server switch 144 and each UE gateway 130 that receives information of a specific content item stores a corresponding mapping in its cache list for that content item. In this way, some or all of the CDN nodes 130/144/150 of the CDN network 120 become at least partially populated with mappings for some or all of the content items available from the content servers 160.

Note that, if the domain of a UE 110 is different from the domain of the SS mesh network 140, then the UE gateway 130 connected to the UE 110 translates between those two different domains. Similarly, if the domain of a content server 160 is different from the domain of the SS mesh network 140 (e.g., if the content server's domain is private and the SS mesh network's domain is the internet), then the server gateway 150 connected to the content server 160 translates between those two different domains.

Figure 2:
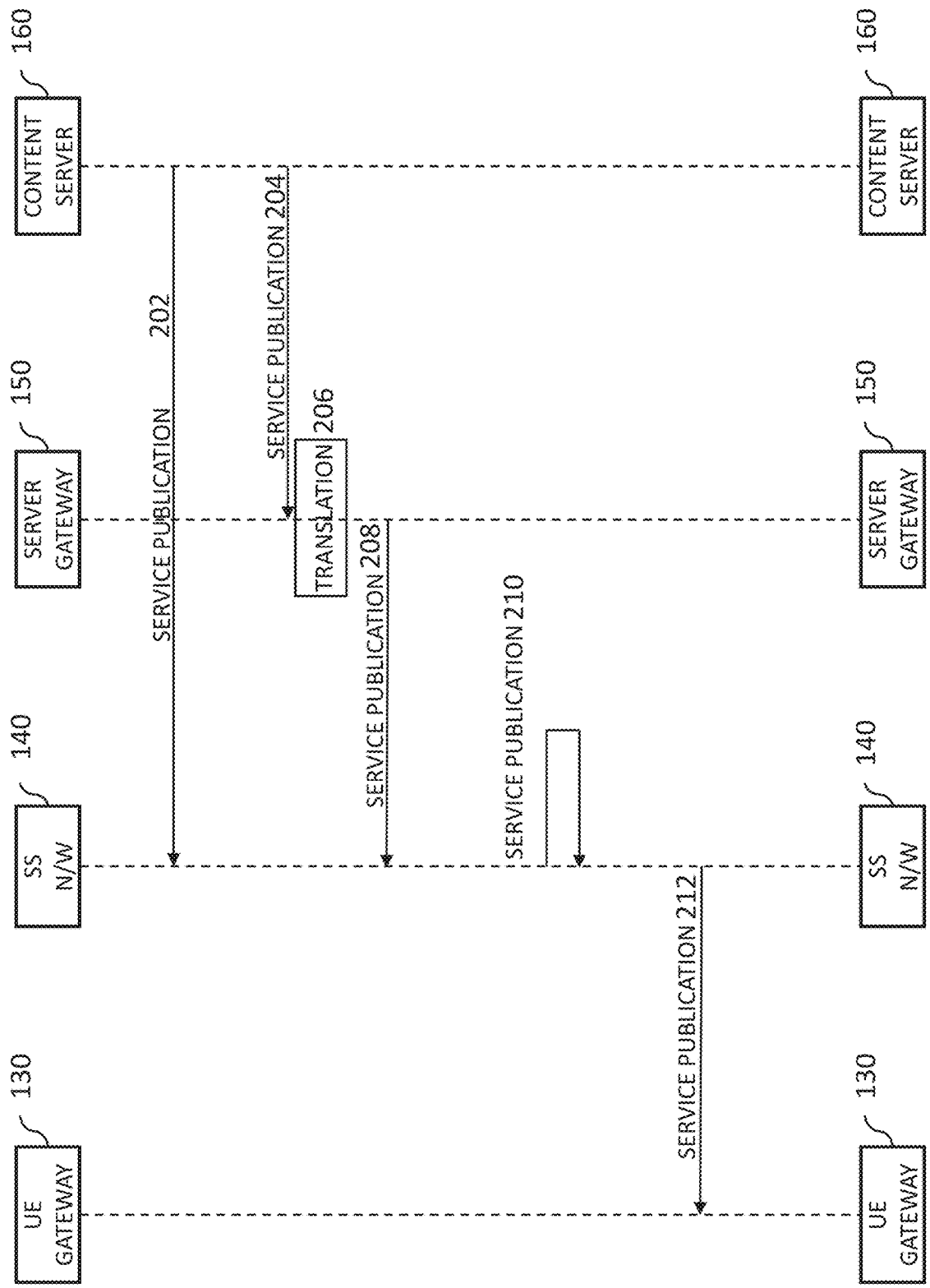
FIG. 2 is a signal flow diagram representing service publication in the content delivery system of FIG. 1, according to certain embodiments of the present disclosure.

FIG. 2 is a signal flow diagram representing service publication in the content delivery system 100 of FIG. 1, according to certain embodiments of the present disclosure. FIG. 2 shows a particular UE gateway 130, the SS mesh network 140, a particular server gateway 150, and a particular content server 160, where the content server 160 publicizes information (i.e., service availability data) for a specific content item available from that content server 160, and each CDN node 130/144/150 that receives that information adds a corresponding mapping to its cache list for that content item.

Referring to FIG. 2, if the content server 160 and the SS mesh network 140 are in the same domain (e.g., both in the same private domain or both in the public internet domain), then, in step 202, the content server 160 can send a service publication message containing the information for the specific content item directly to a connected service switch 144 (not explicitly shown in FIG. 2) in the last level 142(2) of the SS mesh network 140, which service switch 144 adds a corresponding mapping to its cache list. Note that, since the server gateway 150 is also connected to the content server 160, the server gateway 150 may also receive the service publication message and add a corresponding mapping to its cache list.

If the content server 160 and the SS mesh network 140 are not in the same domain, then, in step 204, the content server 160 sends the service publication message for the specific content item to its connected server gateway 150, which adds a corresponding mapping to its cache list and, in step 206, translates the service publication message between the domain of the content server 160 and the domain of the SS mesh network 140 in step 206, and then, in step 208, forwards the translated service publication message to the connected service switch 144 in the last level 142(2) of the SS mesh network 140.

In either domain situation, that service switch 144 in the last level 142(2) of the SS mesh network 140 adds a corresponding mapping to its cache list and, in step 210, forwards the service publication message to one or more of its connected service switches 144 (not explicitly shown in FIG. 2) in the first level 142(1) of the SS mesh network 140. In step 212, each of those connected service switches 144 in the first level 142(1) of the SS mesh network 140 add a corresponding mapping in its cache list and forwards the service publication message to its connected UE gateway 130, which adds a corresponding mapping in its cache list.

In some implementations, the service publication messages include at least some or all of the following information:
- Public service name, (single or list of) host name. The public service name is a globally unique string in the service space. A service space is an eco-system comprising end user equipments, networks, services, and all hardware/software to host a service.
- Internal service configuration (name/address as above for Intranet) which is used for test run (optional). The internal service configuration is for testing (when the UE 110 is inside the same domain as the CDN network 120);
- Service identification is a unique string in the service domain (similar to a unique enterprise application id in a company network), which may contain the following data:
    - A web link http://domain-name/service-name
    - Alias web links (optional)
    - Search tokens (e.g., "movie", "Jurassic park") (optional)
    - DNS: Port, cluster IPv6/IPv4 address, gateway address as static configuration
    - Protocol: TCP/IP, UDP
- QoS parameters: bandwidth (e.g. 1000 Mbps), full duplex
- Firewall rule: a combination of:
    - User (read/write/admin allowed, rejected), source/destination virtual local area network (VLAN), ingress/egress port, services allowed (e.g. DNS, HTTP, or HTTPS) (optional)
    - Access rule: VLAN access rights (optional)
    - Access policy: user subscription rights (e.g., children control, subscriber category) (optional)

A service instance is an application created as a virtual playback recorder after a service instance request from the subscribing user of a UE 110 is received at and accepted by a content server 160. The firewall rule defines (i) which VLAN with which port a user can use, (ii) which protocols are allowed for the user, and (iii) the user's access rights. VLAN is introduced for security. When a data streaming for a user is via a specific VLAN, then hacking across VLAN is more complicated than without a VLAN mechanism. An access rule with VLAN access rights defines whether a VLAN is used for data streaming purpose or service deploying purpose. An administrator can use a "write authorize" right via a write-authorized VLAN to update services data. An access policy defines a (e.g., residential) subscriber and a user's (and the user's family members') access rights. An access policy can identify a subscriber's level of access on service sets. For example, a residential user might only access free movies. An access policy can identify a user's level of access, for example, parental control that allows a child to access a family movie, but rejects access to other movies.

At the end of the service publication processing of FIG. 2, each UE gateway 130, each service switch 144, and each server gateway 150 that can be part of a data path for the specific content item from the content server 160 to any UE 110 will now have a mapping for that content item to an upstream system node 144/150/160 in its cache list.

Figure 3:
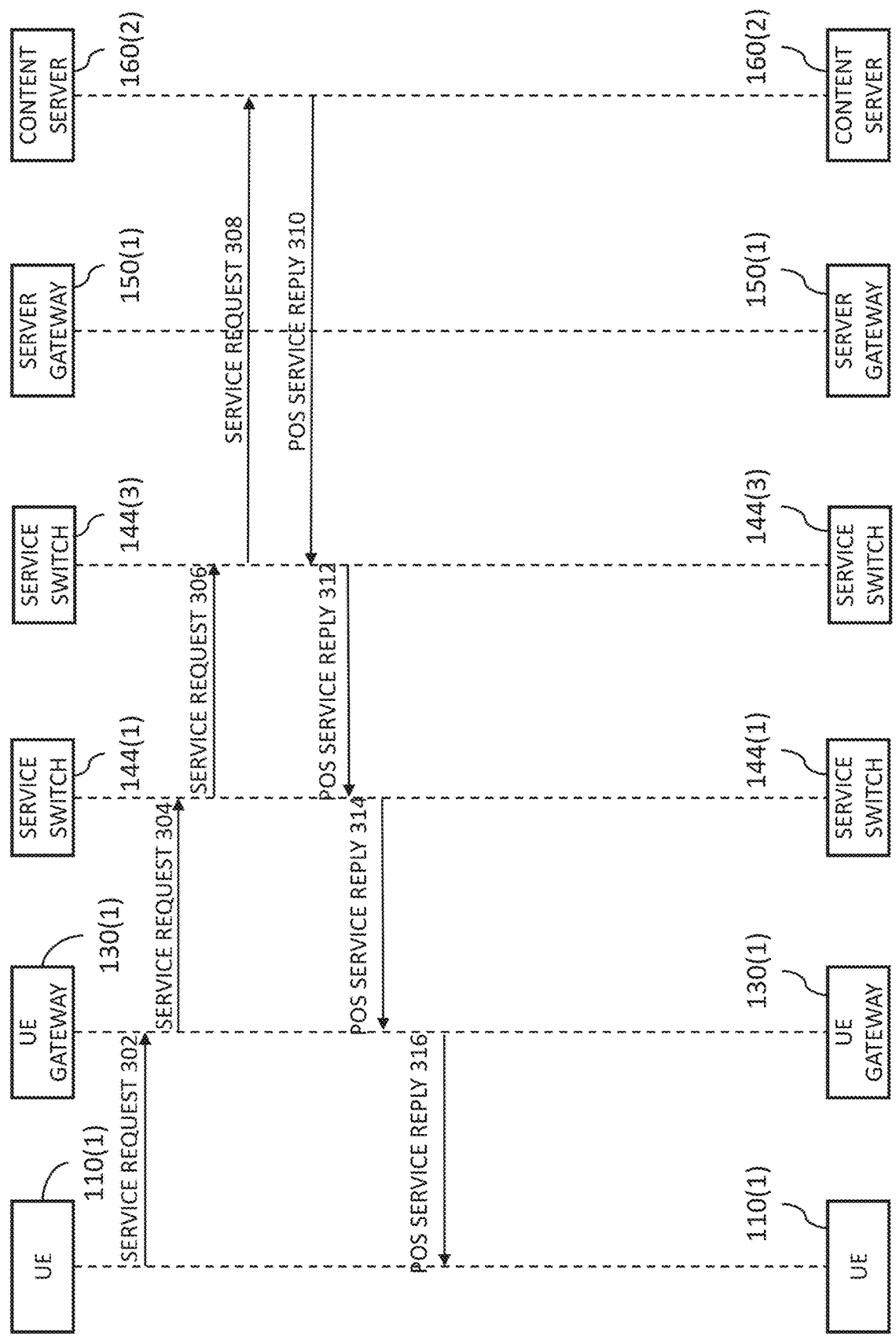
FIG. 3 is a signal flow diagram representing the handling of an example service instance request from UE 110(1) of FIG. 1 for a specific content item that is available from the content server 160(2)

FIG. 3 is a signal flow diagram representing the handling of an example service instance request from UE 110(1) of FIG. 1 for a specific content item that is available from the content server 160(2) (although UE 110(1) may be unaware of that fact), where (a) the SS mesh network 140 and the content server 160(2) are in the same domain and (b) mappings for the specific content item are already stored in the cache lists of the appropriate CDN nodes 130/144/150 either (i) due to previous service publication from content server 160(2) or (ii) due to previous registration of a data path for that content item.

As shown in FIG. 3, in step 302, UE 110(1) transmits, to its connected UE gateway 130(1), an upstream service instance request for the specific content item. UE gateway 130(1) determines that a mapping for the specific content item identifying service switch 144(1) is in its cache list and, in step 304, forwards the upstream service instance request to service switch 144(1) with the upstream service instance request including a path defined by the IP addresses of UE 110(1), UE gateway 130(1), and service switch 144(1) appended together. Service switch 144(1) determines that a mapping for the specific content item identifying service switch 144(3) is in its cache list and, in step 306, forwards the upstream service instance request to service switch 144(3) with the IP address of service switch 144(3) appended to the defined path. Since the SS mesh network 140 and the content server 160(2) are in the same domain, service switch 144(3) determines that a mapping for the specific content item directly to content server 160(2) is in local cache list and, in step 308, forwards the upstream service instance request directly to content server 160(2) with the IP address of content server 160(2) appended to the defined path.

In response, if the content server 160(2) accepts the service instance request, in step 310, content server 160(2) transmits a positive downstream service instance reply directly to service switch 144(3), which, in step 312, forwards the positive downstream service instance reply to service switch 144(1), which, in step 314, forwards the positive downstream service instance reply to UE gateway 130(1), which, in step 316, forwards the positive downstream service instance reply to UE 110(1).

When a UE 110 receives a positive downstream service instance reply from a content server 160 in response to the UE's upstream service instance request, the UE 110 can then start to use conventional data-plane communications (not shown in FIG. 3) to receive media streaming for the specific content item. As part of those communications, the content server 160 sends a user-authorize message through the successfully defined data path. The user-authorize message enables the CDN nodes 130/144/150 to provide a required quality of service (QOS) condition. The user-authorize message contains the advice of charge (AoC) to UE 110 about the fees for the user when the movie is watched. The message parameter QoS is used by the CDN nodes 130/144/150 to allocate sufficient network resources for the streaming transported between the content server 160 and the UE 110. The content server 160 determines how much QoS must be configured by the CDN nodes 130/144/150, where the QoS may depend on the type of service (e.g., gaming, video, or virtual reality/augmented reality (VR/AR)), quality of movie resolution, network overload conditions, and subscriber fee/membership categories. The connected UE gateway 130 may need to change the UE's VLAN and firewall rules based on the registration and authorization rules. After this time point, the UE's application interface is configured by the UE gateway 130 to a VLAN with corresponding firewall setup that can be connected to the service instance. When authorization is completed, the data path is set up similar to a data-plane tunnel with required QoS support.

Figure 4:
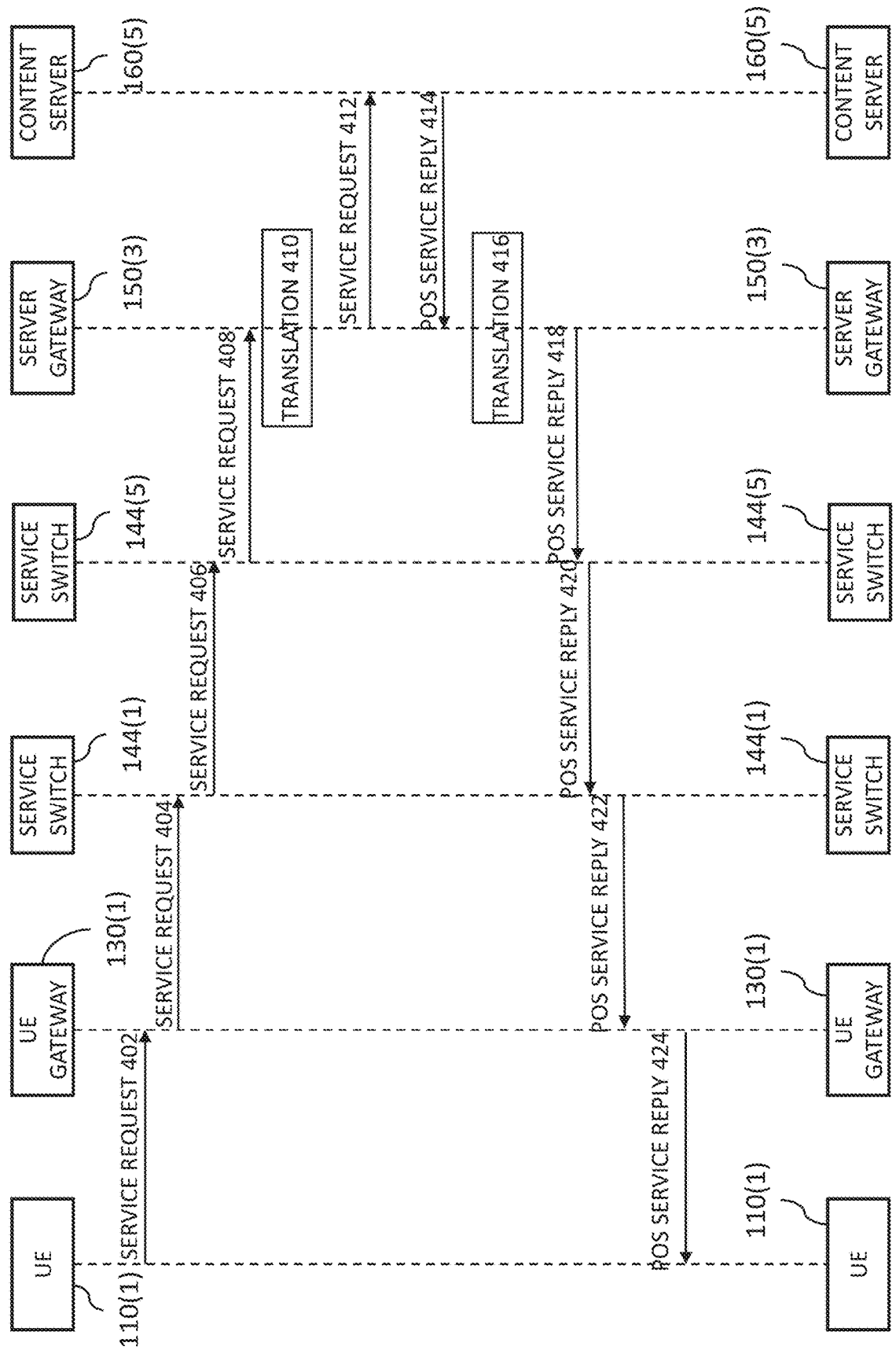
FIG. 4 is a signal flow diagram representing the handling of an example service instance request from UE 110(1) of FIG. 1 for a different content item that is available from the content server 160(5)

FIG. 4 is a signal flow diagram representing the handling of an example service instance request from UE 110(1) of FIG. 1 for a different content item that is available from the content server 160(5), where (a) the SS mesh network 140 and the content server 160(5) are in the different domains and (b) mappings for the specific content item are already stored in the cache lists of the appropriate CDN nodes 130/144/150.

In FIG. 4, the signal flow of steps 402-424 is similar to the signal flow of steps 302-316 in FIG. 3, except for the following:

- The mapping at service switch 144(1) for this different content item identifies service switch 144(5), instead of service switch 144(3), and appends the IP address for service switch 144(5), instead of the IP address for service switch 144(3), to the defined path;
- Since the SS mesh network 140 and content server 160(5) are in different domains, instead of forwarding the upstream service instance request directly to content server 160(5), in step 408, service switch 144(5) forwards the upstream service instance request to server gateway 150(3) with the IP address for server gateway 150(3) appended to the defined path, and, in step 412, server gateway 150(3) forwards the upstream service instance request to content server 160(5) with the IP address for content server 160(5) appended to the defined path;
- In step 410, server gateway 150(3) translates the upstream service instance request received from service switch 144(5) in step 408 for the domain change before forwarding the translated upstream service instance request to content server 160(5) in step 412;
- Again, since the SS mesh network 140 and content server 160(5) are in the different domains, instead of transmitting the positive downstream service instance reply directly to service switch 144(5), in step 414, content server 160(5) transmits the positive downstream service instance reply to server gateway 150(3), which, in step 418, forwards the positive downstream service instance reply to service switch 144(5); and
- In step 416, server gateway 150(3) translates the positive downstream service instance reply received from content server 160(5) in step 414 for the domain change before forwarding the translated positive downstream service instance reply to service switch 144(5) in step 418.

After the signal flow processing of FIG. 4, the processing proceeds as described above for FIG. 3.

Figure 5:
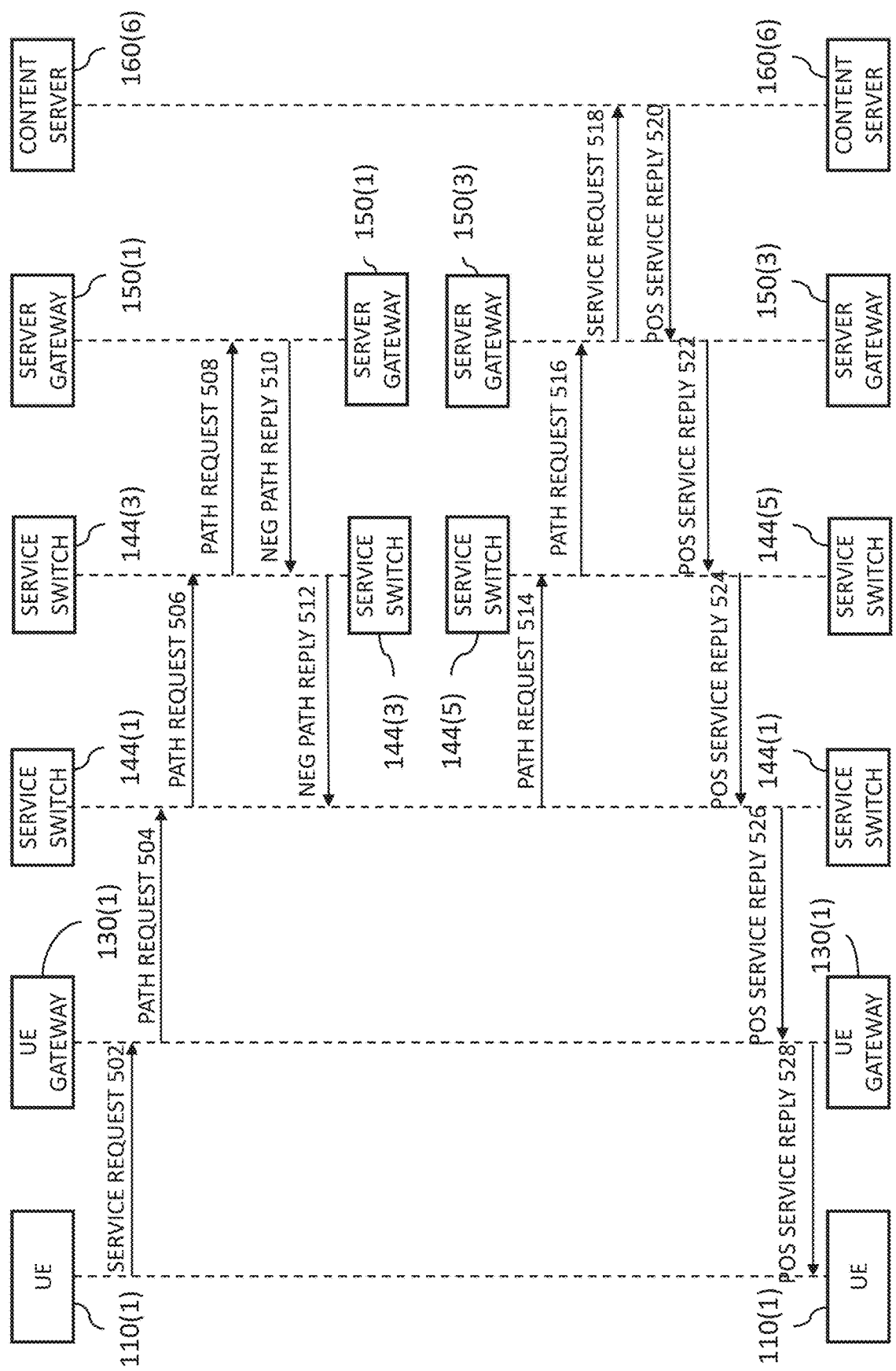
FIG. 5 is a signal flow diagram representing the handling of an example service instance request from UE 110(1) of FIG. 1 for a particular content item that is available from only the content server 160(6)

FIG. 5 is a signal flow diagram representing the handling of an example service instance request from UE 110(1) of FIG. 1 for a particular content item that is available from only the content server 160(6), where the mapping for the specific content item is already stored in the cache list in server gateway 150(3), but not in server gateway 150(1) and not in any of the service switches 144 or in UE gateway 130(1). In that case, a path search needs to be performed to identify a user-plane data path to a content server 160 having the requested content item.

When a path search is initiated at a UE gateway 130, the UE gateway 130 initially defines the path by appending together (i) the IP address of the UE 110 that sent the service instance request to the UE gateway 130, (ii) its own IP address, and (iii) the IP address of the connected service switch 144 in the first level 142(1) of the SS mesh network 140 as in "UE 110 IP address+UE gateway 130 IP address+service switch 144 IP address". The UE gateway 130 then sends an upstream path registration request containing the defined path to that service switch 144. The defined path is extended with an additional IP address entry whenever the upstream path registration request is sent to the next upstream CDN node 144/150.

If a particular path search fails to find a mapping for the requested content item at a server gateway 150, then a path rebinding process occurs in which the defined path is retraced in the downstream direction with each traversed CDN node 130/144/150 removing its IP address from the defined path in order to continue the path search along a different path, if available. If another possible path is available, then the corresponding CDN node 130/144 will send an upstream path registration request to a corresponding upstream CDN node 144/150 with the defined path including the IP address of that corresponding upstream CDN node 144/150 in another attempt to find the requested content item. This process of binding and rebinding the data path continues until the requested content item is successfully found or until all possible data paths have been tried.

When the path search uses a round-robin mechanism, a forwarding hop sequence table is defined in each CDN node 130/144. When the path search uses a randomized mechanism, then a fixed forwarding hop sequence is not applied. Instead, each CDN node 130/144 caches the forwarded hop for each failed binding procedure to remind the CDN node 130/144 not to try that path again.

As shown in the example of FIG. 5, in step 502, UE 110(1) transmits a service instance request for the specific content item to its connected UE gateway 130(1). UE gateway 130(1) determines that a mapping for the requested content item is not in its cache list. In that case, in step 504, UE gateway 130(1) sends an upstream path registration request with a path defined by "UE 110(1) IP address+UE gateway 130(1) IP address+service switch 144(1) IP address" to service switch 144(1), which also determines that a mapping for the requested content item is not in its cache list. As such, in step 506, service switch 144(1) appends "+service switch 144(3) IP address" to the defined path and forwards the upstream path registration request to service switch 144(3) (i.e., the first of the two service switches 144 in the second level 142(2) of the SS mesh network 140 to which service switch 144(1) is connected), which also determines that a mapping for the requested content item is not in its cache list. As such, in step 508, service switch 144(3) appends "+server gateway 150(1) IP address" to the defined path and forwards the upstream path registration request to server gateway 150(1), which also determines that a mapping for the requested content item is not in its cache list.

As such, a path rebinding process is initiated in which, in step 510, server gateway 150(1) removes "+server gateway 150(1) IP address" from the defined path and transmits a negative downstream path registration reply (containing the defined path) to service switch 144(3), which, in step 512, removes "+service switch 144(3) IP address" from the defined path and forwards the negative downstream path registration reply to service switch 144(1). In response, in step 514, service switch 144(1) appends "+service switch 144(5) IP address" to the defined path and transmits an upstream path registration request to service switch 144(5) (i.e., the other service switch 144 in the second level 142(2) of the SS mesh network 140 to which service switch 144(1) is connected), which determines that a mapping for the requested content item is not in its cache list. As such, in step 516, service switch 144(5) appends "+server gateway 150(3) IP address" to the defined path and forwards the upstream path registration request to server gateway 150(3), which determines that a mapping to content server 160(6) for the requested content item is in its cache list. As such, in step 518, server gateway 150(3) appends "+content server 160(6) IP address" to the defined path and transmits an upstream service instance request to content server 160(6) for the requested content item.

In response, if content server 160(6) accepts the service instance request, in step 520, content server 160(6) transmits a positive downstream service instance reply to server gateway 150(3) (containing the defined path), which, in step 522, forwards the positive downstream service instance reply to service switch 144(5), which updates its cache list to add a mapping for the requested content item identifying server gateway 150(3) and, in step 524, forwards the positive downstream service instance reply to service switch 144(1), which updates its cache list to add a mapping for the requested content item identifying service switch 144(5) and, in step 526, forwards the positive downstream service instance reply to UE gateway 130(1), which updates its local cache to add a mapping for the requested content item identifying service switch 144(1) and, in step 528, forwards the positive downstream service instance reply to UE 110(1).

After the signal flow processing of FIG. 5, content server 160(6) can transmit downstream data packets containing the requested content item to UE 110(1) via the defined data path consisting of server gateway 150(3), service switch 144(5), service switch 144(1), and UE gateway 130(1). Furthermore, after the signal flow processing of FIG. 5, each of UE gateway 130(1), service switch 144(1), service switch 144(5), and server gateway 150(3) will have mappings in their respective cache lists for retrieving the requested content item from content server 160(6) in the future by the same or other UEs 110.

Note that, although not explicitly shown in FIG. 5, if the content server 160(6) and the SS mesh network 140 are not in the same domain, then the server gateway 150(3) will have to translate upstream and downstream messages between service switch 144(5) and content server 160(6).

After the signal flow processing of FIG. 5, the processing proceeds as described above for FIG. 3.

Figure 6:
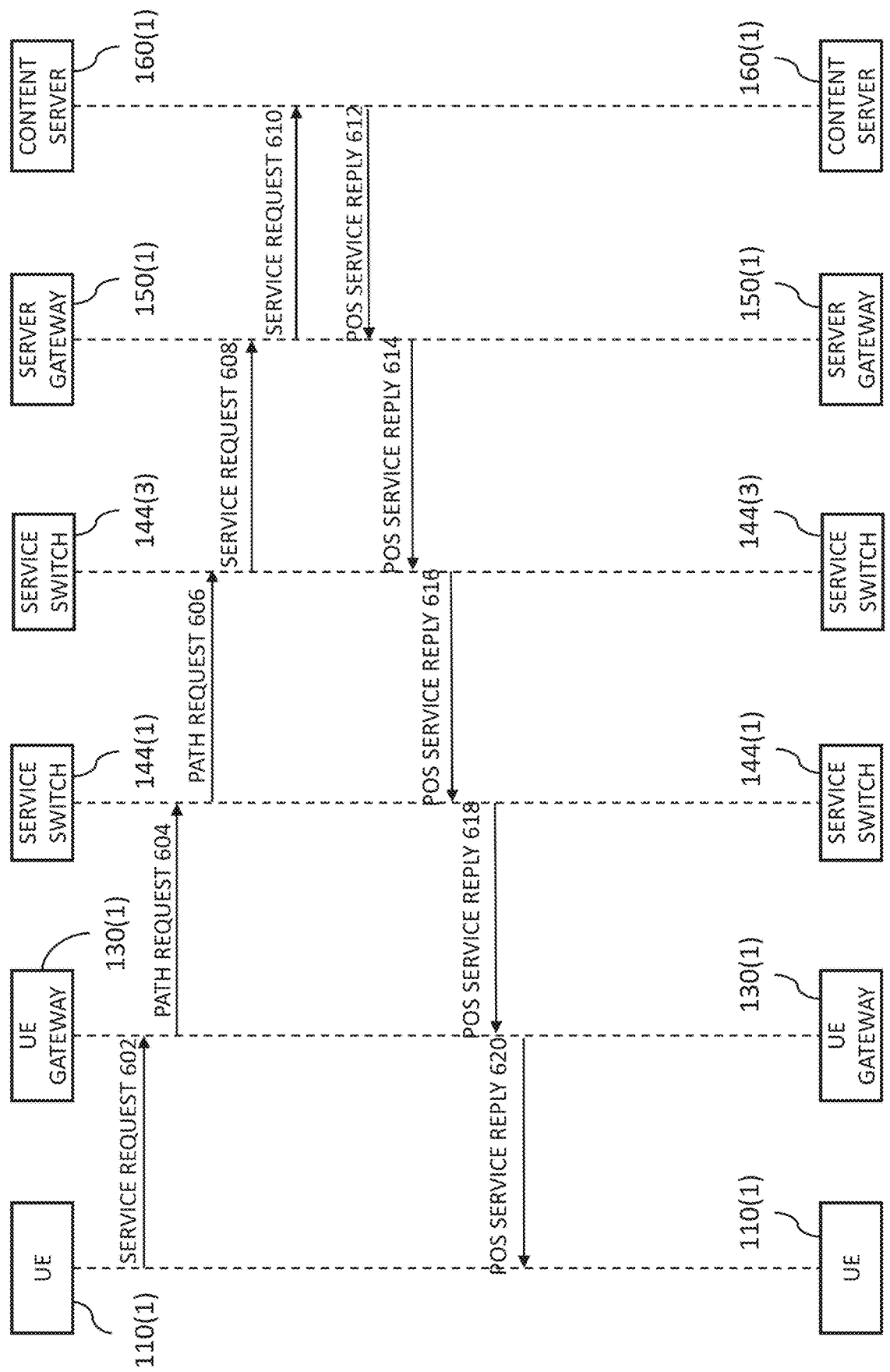
FIG. 6 is a signal flow diagram representing the handling of an example service instance request from UE 110(1) of FIG. 1 for a specific content item that is available from only the content server 160(1), where mappings for the specific content item are already stored in server gateway 150(1) and service switch 144(3), but not in service switch 144(1) and not in UE gateway 130(1)

FIG. 6 is a signal flow diagram representing the handling of an example service instance request from UE 110(1) of FIG. 1 for a specific content item that is available from only the content server 160(1), where mappings for the specific content item are already stored in server gateway 150(1) and service switch 144(3), but not in service switch 144(1) or in UE gateway 130(1). This situation could exist if, for example, in the absence of service publication for that content item to UE gateway 130(1) and service switch 144(1), a user of UE 110(3) had previously retrieved the same content item from the same content server 160(1) using the data path consisting of server gateway 150(1), service switch 144(3), service switch 144(2), and UE gateway 130(2).

As shown in FIG. 6, in step 602, UE 110(1) transmits an upstream service instance request for the specific content item to its connected UE gateway 130(1). UE gateway 130(1) determines that a mapping for the requested content item is not in its cache list. In that case, in step 604, UE gateway 130(1) forwards an upstream path registration request to service switch 144(1) with a defined path of "UE 110(1) IP address+UE gateway 130(1) IP address+service switch 144(1) IP address". Service switch 144(1) determines that the requested content item is not its cache list and, in step 606, forwards the upstream path registration request to service switch 144(3) (i.e., the first of the two service switches 144 in the second level 142(2) of the SS mesh network 140 to which service switch 144(1) is connected) with "+service switch 144(3) IP address" appended to the defined path. In this case, service switch 144(3) determines that a mapping identifying server gateway 150(1) for the requested content item is in its cache list. As such, in step 608, service switch 144(3) transmits an upstream service instance request for the requested content item to server gateway 150(1) with "+server gateway 150(1) IP address" appended to the defined path. Server gateway 150(1) determines that a mapping to content server 160(1) for the requested content item is in its cache list. As such, in step 610, server gateway 150(1) forwards the upstream service instance request to content server 160(1) for the requested content item with "+content server 160(1) IP address" appended to the defined path.

In response, if content server 160(1) accepts the service instance request, in step 612, content server 160(1) transmits a positive downstream service instance reply to server gateway 150(1), which, in step 614, forwards the positive downstream service instance reply to service switch 144(3), which, in step 616, forwards the positive downstream service instance reply to service switch 144(1), which updates its cache list to add a mapping for the requested content item identifying service switch 144(3) and, in step 618, forwards the positive downstream service instance reply to UE gateway 130(1), which updates its cache list to add a mapping for the requested content item identifying service switch 144(1) and, in step 620, forwards the positive downstream service instance reply to UE 110(1).

After the signal flow processing of FIG. 6, content server 160(1) can transmit downstream packets containing the requested content item to UE 110(1) via the partially newly registered data path consisting of server gateway 150(1), service switch 144(3), service switch 144(1), and UE gateway 130(1). Furthermore, after the signal flow processing of FIG. 5, UE gateway 130(1) and service switch 144(1) will have new mappings in their respective cache lists for retrieving the requested content item from content server 160(1) in the future by the same or other UEs 110.

Here, too, although not explicitly shown in FIG. 6, if the content server 160(1) and the SS mesh network 140 are not in the same domain, the server gateway 150(1) will have to translate upstream and downstream messages between service switch 144(3) and content server 160(1).

After the signal flow processing of FIG. 6, the processing proceeds as described above for FIG. 3.

In some implementations, the UEs 110 transmit service requests having service addresses in a query format (e.g., in a sentence or token) and the cache lists maintained by the receiving UE gateways 130 map those service addresses to IP addresses of the service switches in the first level 142(1) of the SS mesh network 140, where that mapping occurs above the IP layer, for example, at the transport layer or application layer of the Open Systems Interconnection (OSI) protocol stack.

In some implementations, a Service Sensitive Gateway (SSG) (not shown) can optionally be deployed in the same service domain at the UEs 110 to perform key management and/or encryption of control/user plane messages if required for privacy to ensure both security and Network Address Translation (NAT). An SSG can be a function or component co-located with a UE 110.

Figure 7:
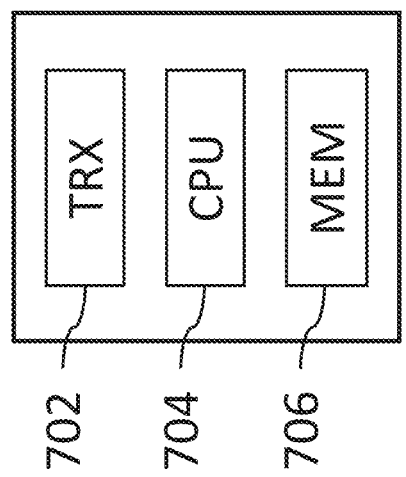
FIG. 7 is a simplified hardware block diagram of an example node that can be used to implement any of the system nodes of FIG. 1.

FIG. 7 is a simplified hardware block diagram of an example node 700 that can be used to implement any of the system nodes 110, 130, 144, 150, and 160 of FIG. 1. As shown in FIG. 7, the node 700 includes (i) communication hardware (e.g., wireless, wireline, and/or optical transceivers (TRX)) 702 that supports communications with other nodes, (ii) a processor (e.g., CPU microprocessor) 704 that controls the operations of the node 700, and (iii) a memory (e.g., RAM, ROM) 706 that stores code executed by the processor 704 and/or data generated and/or received by the node 700.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1-only A; 2-only B; 3-both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A content delivery network (CDN) node for a CDN network for delivering content items in a content delivery system, the CDN network comprising:
    one or more user equipment (UE) gateways, each UE gateway configured to be connected to one or more UEs;
    a service switch (SS) mesh network comprising two or more levels, each level comprising one or more service switches, wherein each UE gateway is connected to a service switch in a first level of the SS mesh network; and
    one or more server gateways, each server gateway configured to be connected to one or more content servers, wherein each server gateway is connected to a service switch in a last level of the SS mesh network, wherein:
    the CDN node is one of a UE gateway, a service switch, or a server gateway of the CDN network;
    each UE, CDN node, and content server is a system node of the content delivery system; and
    the CDN node comprises a memory connected to a processor configured to cause the CDN node to:
        maintain a cache list of mappings, each mapping identifying a corresponding upstream system node for a content item available at a corresponding content server of the content delivery system; and
        receive an upstream service instance request for a specific content item by a corresponding UE and, upon determining that a mapping for the specific content item is in its cache list, forward the upstream service instance request to the corresponding upstream system node as part of a process of defining a downstream data path for the specific content item from the corresponding content server to the corresponding UE.

2. The CDN node of claim 1, wherein the CDN node is a UE gateway of the CDN network, wherein the UE gateway is configured to receive an upstream service instance request for a specific content item by a corresponding UE and, upon determining that a mapping for the specific content item is not in its cache list, forward an upstream path registration request to a connected service switch to initiate a path registration process for defining a downstream data path for the specific content item from the corresponding content server to the corresponding UE.

3. The CDN node of claim 2, wherein the UE gateway is configured to include a defined path in the upstream path registration request that includes an IP address of the corresponding UE, its own IP address, and an IP address of the connected service switch.

4. The CDN node of claim 1, wherein the CDN node is a UE gateway of the CDN network, wherein, upon receiving a positive downstream service instance reply, the UE gateway is configured to forward the positive downstream service instance reply to a downstream UE identified in the positive downstream service instance reply.

5. The CDN node of claim 1, wherein the CDN node is a service switch of the CDN network, wherein the service switch is configured to receive an upstream service instance request for a specific content item by a corresponding UE and, upon determining that a mapping for the specific content item is not in its cache list, forward an upstream path registration request to a connected upstream CDN node to initiate a path registration process for defining a downstream data path for the specific content item from the corresponding content server to the corresponding UE.

6. The CDN node of claim 1, wherein the CDN node is a service switch of the CDN network, wherein the service switch is configured to receive an upstream path registration request for a specific content item and, upon determining that a mapping for the specific content item is not in its cache list, forward the upstream path registration request to a connected upstream CDN node to continue a path registration process for defining a downstream data path for the specific content item from the corresponding content server to the corresponding UE.

7. The CDN node of claim 1, wherein the CDN node is a service switch of the CDN network, wherein the service switch is configured to receive an upstream path registration request for a specific content item and, upon determining that a mapping for the specific content item is in its cache list, send an upstream service instance request for the specific content item to a connected upstream CDN node to continue a path registration process for defining a downstream data path for the specific content item from the corresponding content server to the corresponding UE.

8. The CDN node of claim 1, wherein the CDN node is a service switch of the CDN network, wherein, upon receiving a positive downstream service instance reply, the service switch is configured to forward the positive downstream service instance reply to a downstream CDN node identified in the positive downstream service instance reply.

9. The CDN node of claim 1, wherein the CDN node is a service switch of the CDN network, wherein, upon receiving a negative downstream path registration reply for a specific content item and upon determining that another possible path exists for the specific content item, the service switch is configured to send an upstream path registration request to an upstream CDN node corresponding to the other possible path.

10. The CDN node of claim 1, wherein the CDN node is a service switch of the CDN network, wherein, upon receiving a negative downstream path registration reply for a specific content item and upon determining that another possible path does not exist for the specific content item, a service switch is configured to forward the negative downstream path registration reply to a downstream CDN node identified in the negative downstream path registration reply.

11. The CDN node of claim 1, wherein the CDN node is a server gateway of the CDN network, wherein the server gateway is configured to receive an upstream path registration request for a specific content item and, upon determining that a mapping for the specific content item is not in its cache list, send a negative downstream path registration reply for the specific content item to a connected downstream service switch.

12. The CDN node of claim 1, wherein the CDN node is a server gateway of the CDN network, wherein the server gateway is configured to receive an upstream path registration request for a specific content item and, upon determining that a mapping is in its cache list for the specific content item identifying a specific content server, send an upstream service instance request for the specific content item to the specific content server.

13. The CDN node of claim 1, wherein the CDN node is a server gateway of the CDN network, wherein, upon receiving a positive downstream service instance reply, the server gateway is configured to forward the positive downstream service instance reply to a service switch identified in the positive downstream service instance reply.

14. A method for a content delivery network (CDN) node for a CDN network for delivering content items in a content delivery system, the CDN network comprising:
one or more user equipment (UE) gateways, each UE gateway configured to be connected to one or more UEs;
a service switch (SS) mesh network comprising two or more levels, each level comprising one or more service switches, wherein each UE gateway is connected to a service switch in a first level of the SS mesh network; and
one or more server gateways, each server gateway configured to be connected to one or more content servers, wherein each server gateway is connected to a service switch in a last level of the SS mesh network; wherein:
the CDN node is one of a UE gateway, a service switch, or a server gateway of the CDN network;
each UE, CDN node, and content server is a system node of the content delivery system; and
the method comprising the CDN node:
maintaining a cache list of mappings, each mapping identifying a corresponding upstream system node for a content item available at a corresponding content server of the content delivery system; and
receiving an upstream service instance request for a specific content item by a corresponding UE and, upon determining that a mapping for the specific content item is in its cache list, forwarding the upstream service instance request to the corresponding upstream system node as part of a process of defining a downstream data path for the specific content item from the corresponding content server to the corresponding UE.

15. The method of claim 14, wherein the CDN node is a UE gateway of the CDN network, wherein the UE gateway receives an upstream service instance request for a specific content item by a corresponding UE and, upon determining that a mapping for the specific content item is not in its cache list, forwards an upstream path registration request to a connected service switch to initiate a path registration process for defining a downstream data path for the specific content item from the corresponding content server to the corresponding UE.

16. The method of claim 15, wherein the UE gateway includes a defined path in the upstream path registration request that includes an IP address of the corresponding UE, its own IP address, and an IP address of the connected service switch.

17. The method of claim 14, wherein the CDN node is a UE gateway of the CDN network, wherein, upon receiving a positive downstream service instance reply, the UE gateway forwards the positive downstream service instance reply to a downstream UE identified in the positive downstream service instance reply.

18. The method of claim 14, wherein the CDN node is a service switch of the CDN network, wherein the service switch receives an upstream service instance request for a specific content item by a corresponding UE and, upon determining that a mapping for the specific content item is not in its cache list, forwards an upstream path registration request to a connected upstream CDN node to initiate a path registration process for defining a downstream data path for the specific content item from the corresponding content server to the corresponding UE.

19. The method of claim 18, wherein the service switch appends an IP address of the upstream CDN node to a defined path in the upstream path registration request.

20. The method of claim 14, wherein the CDN node is a service switch of the CDN network, wherein the service switch receives an upstream path registration request for a specific content item and, upon determining that a mapping for the specific content item is not in its cache list, forwards the upstream path registration request to a connected upstream CDN node to continue a path registration process for defining a downstream data path for the specific content item from the corresponding content server to the corresponding UE.

21. The method of claim 20, wherein the service switch appends an IP address of the upstream CDN node to a defined path in the upstream path registration request.

22. The method of claim 14, wherein the CDN node is a service switch of the CDN network, wherein the service switch receives an upstream path registration request for a specific content item and, upon determining that a mapping for the specific content item is in its cache list, sends an upstream service instance request for the specific content item to a connected upstream CDN node to continue a path registration process for defining a downstream data path for the specific content item from the corresponding content server to the corresponding UE.

23. The method of claim 22, wherein the service switch appends an IP address of the upstream CDN node to a defined path in the upstream service instance request.

24. The method of claim 14, wherein the CDN node is a service switch of the CDN network, wherein, upon receiving a positive downstream service instance reply, the service switch forwards the positive downstream service instance reply to a downstream CDN node identified in the positive downstream service instance reply.

25. The method of claim 14, wherein the CDN node is a service switch of the CDN network, wherein, upon receiving a negative downstream path registration reply for a specific content item and upon determining that another possible path exists for the specific content item, the service switch sends an upstream path registration request to an upstream CDN node corresponding to the other possible path.

26. The method of claim 25, wherein the service switch appends an IP address of the upstream CDN node to a defined path in the upstream service instance request.

27. The method of claim 14, wherein the CDN node is a service switch of the CDN network, wherein, upon receiving a negative downstream path registration reply for a specific content item and upon determining that another possible path does not exist for the specific content item, a service switch forwards the negative downstream path registration reply to a downstream CDN node identified in the negative downstream path registration reply.

28. The method of claim 27, wherein the service switch removes its IP address from a defined path in the negative downstream path registration reply.

29. The method of claim 14, wherein the CDN node is a server gateway of the CDN network, wherein the server gateway receives an upstream path registration request for a specific content item and, upon determining that a mapping for the specific content item is not in its cache list, sends a negative downstream path registration reply for the specific content item to a connected downstream service switch.

30. The method of claim 29, wherein the server gateway removes its IP address from a defined path in the negative downstream path registration reply.

31. The method of claim 14, wherein the CDN node is a server gateway of the CDN network, wherein the server gateway receives an upstream path registration request for a specific content item and, upon determining that a mapping is in its cache list for the specific content item identifying a specific content server, sends an upstream service instance request for the specific content item to the specific content server.

32. The method of claim 31, wherein the server gateway appends an IP address of the content server to a defined path in the upstream service instance request.

33. The method of claim 14, wherein the CDN node is a server gateway of the CDN network, wherein, upon receiving a positive downstream service instance reply, the server gateway forwards the positive downstream service instance reply to a service switch identified in the positive downstream service instance reply.

* * * * *